United States Patent [19]

Morita et al.

[11] Patent Number: 4,820,584

[45] Date of Patent: Apr. 11, 1989

[54] MAGNETIC RECORDING MEDIUM AND METHOD OF MANUFACTURING THE SAME

[75] Inventors: Hiroshi Morita, Kawasaki; Osamu Osada, Yokohama, both of Japan

[73] Assignee: Kabushiki Kaisha Toshiba, Kawasaki, Japan

[21] Appl. No.: 60,388

[22] Filed: Jun. 10, 1987

[30] Foreign Application Priority Data

Jun. 12, 1986 [JP] Japan ................... 61-134771

[51] Int. Cl.$^4$ ........................... G11B 5/72; G11B 5/64
[52] U.S. Cl. .................... 428/336; 204/192.15; 204/192.2; 427/131; 427/132; 428/694; 428/695; 428/900
[58] Field of Search .............. 428/695, 694, 328, 329, 428/421, 422, 336; 427/131, 132, 129, 40, 41; 204/192.15, 192.2

[56] References Cited

U.S. PATENT DOCUMENTS

| 4,411,963 | 10/1983 | Aine | 428/457 |
| 4,419,404 | 12/1983 | Arai | 428/336 |
| 4,552,820 | 11/1985 | Lin et al. | 428/611 |
| 4,636,435 | 1/1987 | Yanagihara | 428/421 |
| 4,647,494 | 3/1987 | Meyerson | 428/336 |
| 4,664,976 | 5/1987 | Kimura | 428/336 |
| 4,680,218 | 7/1987 | Kimura | 428/695 |

FOREIGN PATENT DOCUMENTS

| 0171028 | 9/1984 | Japan | 428/329 |
| 0258727 | 12/1985 | Japan | 428/328 |
| 045412 | 3/1986 | Japan . | |
| 142525 | 6/1986 | Japan . | |
| 126627 | 6/1986 | Japan . | |
| 1208621 | 9/1986 | Japan | 428/900 |
| 18624 | 1/1987 | Japan . | |

OTHER PUBLICATIONS

The Impact of Process Parameters and Coating Source on the Properties of Magnetic Recording Layers, K. Roll, Leybold-Heraeus GmbH, P.O. Box 1555, 6450 Hanau, West Germany, received 8/26/85 accepted 9/1/85 from pp. 14 to 18.

Vacuum-Deposited Thin-Metal-Film Disk, E. M. Rossi, G. McDonough, A. Tietze, T. Arnoldussen, A. Brunsch, S. Doss, M. Henneberg, F. Lin, R. Lyn, A. Ting, and G. Trippel, IBM Corporation, Magnetic Recording Institute, San Jose, CA 95193, Mar. 15, 1984, pp. from 2254 to 2256.

*Primary Examiner*—Paul J. Thibodeau
*Attorney, Agent, or Firm*—Cushman, Darby & Cushman

[57] ABSTRACT

A magnetic recording medium according to the present invention comprises a non-magnetic substrate, a magnetic recording layer formed on the non-magnetic substrate, and a lubricant layer containing carbon as a major component and formed on the magnetic recording layer. At least one element selected from a group consisting of hydrogen and a halogen is bonded to the carbon, as the major component of the lubricant layer, in a surface region of the lubricant layer. In the formation of the lubricant layer, initially only an inert gas is introduced as an atmospheric gas around a carbon target at the beginning of sputtering, so that the carbon target is sputtered by cations of the inert gas. Thereafter, a gas containing at least one of hydrogen and a halogen is added to sputter the carbon target. Thus, a carbon-hydrogen atomic bond (C-H bond) and/or a carbon-halogen atomic bond (C-X bond; X is a halogen element) are formed on the surface region of the lubricant layer.

11 Claims, 2 Drawing Sheets

MAGNETIC RECORDING MEDIUM AND METHOD OF MANUFACTURING THE SAME

BACKGROUND OF THE INVENTION

I. Field of the Invention

The present invention relates to a magnetic recording medium and a method of manufacturing the same and, more particularly, to a rigid disc having an improved lubricant layer on its uppermost surface and a method of manufacturing the same. II. Description of the Prior Art A recording media applies rigid discs that are incorporated in equipment such as host computer. In recent times, demand has increased for recording media having a high-density memory capacity. In order to satisfy this demand, a continuous thin-film type recording medium having a high coercivity has been developed, which is rapidly becoming more popular than the particulate type medium. In a thin-film type recording medium, a ferromagnetic layer is continuously formed on a non-magnetic substrate by sputtering, deposition, wet plating, or the like. As a result, a thin-film type magnetic recording medium can be obtained, having an extremely high recording density as compared to a particulate type medium. As a material for the ferromagnetic layer, Co-Ni, Co-Cr, Co, Co-Re, Co-Ni-W, Co-Pt, Co-Ni-Pt, Co-Sm, and the like are used in the case of sputtering, and Co-P, Co-Ni-P, Co-Ni-Mn-P, Co-Re-Ni-P, and the like are used in the case of plating. A surface hardening layer (an Ni-P plating layer, and the like) or an underlayer (e.g., Ti, Ge, or the like for a Co-Cr perpendicular magnetization film, and Cr or the like for a Co-Ni longitudinal magnetization film) for improving the characteristics of the magnetic layer is formed between the substrate and the magnetic layer. A lubricant layer ($SiO_2$, C, or the like) is formed on the magnetic layer, for protection against head contact and for lubrication. These layers are often formed by sputtering. This is because sputtering allows selection of a variety of materials, and the easy manufacture of a structure with good magnetic characteristics and anti-corrosion properties. In addition, sputtering imparts good surface properties to the resultant film and allows easy process control.

If in a disc of a thin-film type magnetic recording medium, a Co-Ni alloy is used as a magnetic layer, the thickness of the magnetic layer should fall within the range of 500 Å to 2,000 Å, in order to obtain a sufficiently high reproduction output. However, if the magnetic layer is formed of only the Co-Ni alloy, it will have poor anti-corrosion properties, and hence, a 1,000-Å thick non-magnetic layer (e.g., Cr) with good anti-corrosion properties must be formed on the magnetic layer, in order to compensate for this shortcoming. In addition, a lubricant layer must then be formed on the non-magnetic layer. However, taking the reproduction output level into consideration, the distance at which a head floats above a rotating disc must fall within the range of 2,000 Å to 3,000 Å. If the non-magnetic layer has a thickness of about 1,000 Å, the head should be separated from the magnetic layer accordingly. This also results in a decrease in reproduction output, on account of a spacing loss. Therefore, in order to reduce the spacing loss, a lubricant layer formed on a surface region of the recording medium must be as thin as possible.

In addition, the lubricant layer formed on the uppermost surface of the magnetic recording medium must possess satisfactory anti-shock properties, since, upon power-off, the head falls onto the disc and comes into slidable contact with the lubricant layer. The lubricant layer must also have a high surface smoothness, in order that a stable reproduction output can be obtained. For this purpose, the lubricant layer must be able to remain free from damage even after it has been subjected to twenty to thirty thousand head-falls in a repetitive head-fall resistance test, known as a Contact-Start-and-Stop (to be referred to as CSS hereinafter) test.

In a particulate type magnetic recording medium, a lubricating oil is applied, in an appropriate quantity, to the surface of the disc, so as to impregnate the three-dimensional pattern of the surface layer. The oil oozes to the surface, thus forming a lubricant layer on the disc. However, as is disclosed in Journal of Applied Physics 55(6), if, in a thin-film type magnetic recording medium a lubricating oil in liquid form is applied to a very flat surface formed by sputtering or plating, a so-called head-attraction phenomenon occurs when a magnetic head is brought into contact with the disc surface. When this phenomenon occurs, the disc surface and the head cannot easily be separated from each other. Moreover, the thin-film type magnetic recording medium has no gap for storing the lubricating oil on the surface layer, unlike the particular type magnetic recording medium. Therefore, since the lubricating oil becomes deficient in it's lubricating properties after a short period of time, the medium cannot withstand long-term use.

For the above reasons, in the thin-film type magnetic recording medium, use of liquid lubrication is judged inappropriate, and hence, solid-state lubrication is adopted. As is disclosed in U.S. Pat. No. 4,552,820, graphite having a layer structure is found to be suitable as a solid-state lubrication material for covering the upper-most surface of a recording medium.

As is known, molybdenum disulfide can be used as another solid-state lubirication material. However, it is difficult to form a molybdenum disulfide layer of such a quantity as is suitable as a lubricant layer for the recording medium. For this reason, molybdenum disulfide is not used in practice.

When a solid-state lubricant layer is formed of graphite having a layer structure, a method for sputtering a carbon target in a rare gas atmosphere such as Ar gas is normally employed.

Although carbon graphite having the layer structure has satisfactory bonding properties in relation to the underlayer, the lubricant layer itself breakes up when the slide motion has repeated a relatively small number of times. As a result, the underlayer is exposed and is no longer protected against wear. When discs are mass produced, the reproducibility of the lubricant layer also presents a problem. That is, some of the manufactured media contain graphite having an excellent layer structure and thus possess sufficient durability, but the other media contain graphite having a poor layer structure and hence have not sufficient durability. In the media of insufficient durability, a shearing stress generated during a CSS test fails to act in a direction parallel to the lubricant layer, and the layer is broken up. Thus, the product yield is reduced.

SUMMARY OF THE INVENTION

It is an object of the present invention to provide a magnetic recording medium having a lubricant layer which has good durability, and a method of manufacturing the same.

The magnetic recording medium of the present invention comprises a non-magnetic substrate, a magnetic recording layer formed on the non-magnetic substrate, and a lubricant layer containing carbon as a major component formed on the magnetic recording layer.

At least one element selected from a group consisting of hydrogen and a halogen is bonded to the carbon, as the major component of the lubricant layer, in a surface region of the lubricant layer.

In the formation of the lubricant layer, initially only an inert gas is introduced as an atmospheric gas around a carbon target at the beginning of sputtering, so that the carbon target is sputtered by cations of the inert gas. Thereafter, a gas containing at least one of hydrogen and a halogen is added to sputter the carbon target. Thus, a carbon-hydrogen atomic bond (C-H bond) and/or a carbon-halogen atomic bond (C-X bond; X is a halogen element) are formed on the surface region of the lubricant layer. Since a shearing stress generated during a CSS test can act in a direction parallel to the lubricant layer, the lubrication properties of the lubricant layer can be improved. Since the C-H or C-X bond is formed only on the surface region of the lubricant layer, the durability of the magnetic recording medium as a whole can be improved without impairing the bonding properties of the lubricant layer.

The total thickness of the lubricant layer preferably falls within the range of 150 to 300 Å, and, most preferably, is about 200 Å.

The region including the C-H bond or the like preferably has a thickness of 50 to 200 Å, and preferably contains 5 to 40 atomic % of H, F, Cl, or the like.

DETAILED DESCRIPTION OF THE PREFERRED EMBODIMENT

An embodiment of the present invention will now be described, with reference to the accompanying drawings.

Figure 1:
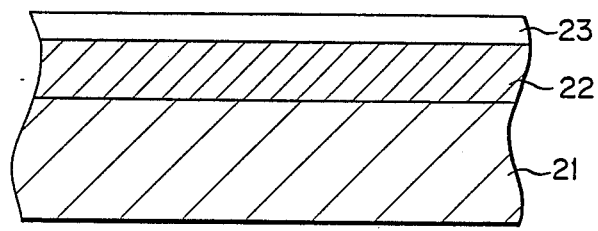
FIG. 1 is a partial sectional view of a magnetic recording medium according to an embodiment of the present invention.

As is shown in FIG. 1, the recording medium according to an embodiment of the present invention has a structure in which magnetic layer 22 and lubricant layer 23 are sequentially formed on non-magnetic substrate 21. Non-magnetic substrate 21 is a flat rigid disc formed of an aluminum alloy plate or a glass plate having a thickness of several millimeters. Magnetic layer 22 is formed such that cobalt or a cobalt alloy is formed on substrate 21, by sputtering, a substantially flat continuous film. Layer 22 has a thickness in the order of several hundred to several thousand Å.

Lubricant layer 23 contains elemental carbon as its major component, and comprises first and second sub-layers. The first sub-layer is made solely of elemental carbon, and the second sub-layer is made of a mixture of elemental carbon and a carbon compound. The carbon compound is made up of a combination of carbon and at least one element selected from the group consisting of hydrogen and halogen. In order to maintain a strong adhesion between lubricant layer 23 and an magnetic layer 22 the first sub-layer carbon must have a thickness of 100 Å or more. The total thickness of lubricant layer 23 is a maximum of 300 Å, and the thickness of the improved surface region (i.e. the second sub-layer) is determined preferably within the range of 50 to 200 Å so that spacing loss is minimized.

The manufacturing conditions of the recording medium are as follows:

First, substrate 21 is placed on a rotary table of a sputtering apparatus. An initial vacuum pressure is set to be $1 \times 10^{-6}$ Torr or less, the table is rotated at a speed of 10 to 30 rpm, and a rare gas at a pressure of $5 \times 10^{-3}$ to $5 \times 10^{-2}$ is introduced into the apparatus. Thus, a cobalt-alloy target is sputtered at room temperature, at a sputtering power of 0.3 to 2 kW. In this way, magnetic layer 22 is formed on substrate 21.

Under substantially the same conditions as those for forming magnetic layer 22, a carbon target is sputtered to form a graphite layer consisting of only carbon. When the carbon layer is grown to a predetermined thickness, an additive gas such as a $CH_4$ gas is added to the apparatus. The flow rate ratio of the additive gas and the rare gas is set to fall within the range of 1:9 to 1:1, and the total pressure of the gases is set to be $1 \times 10^{-3}$ to $8 \times 10^{-2}$ Torr. Under these conditions, sputtering of the carbon target is continued. Then, the graphite layer containing hydrogen is formed on the carbon layer.

Under substantially the same conditions as set out above, when a $CF_4$ gas is added in place of the $CH_4$ gas, a graphite containing a fluorine is formed on the carbon layer.

Figure 2:
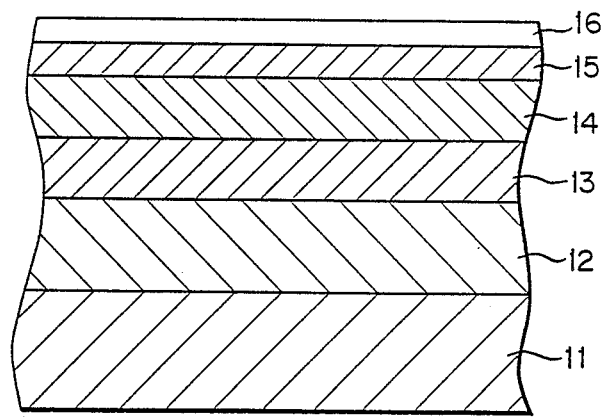
FIG. 2 is a partial sectional view of a magnetic recording medium according to another embodiment of the present invention.

As is shown in FIG. 2, in a recording medium according to another embodiment of the present invention, smoothed layer 12 and underlayer 13 can be provided between substrate 11 and magnetic layer 14, and protective layer 15 can be provided between magnetic layer 14 and lubricant layer 16. Smoothed layer 12 is formed by plating on substrate 11, and its surface is mirror-polished so as to smooth the surface of the structure. Underlayer 13 is provided so as to improve the crystallographical orientation of magnetic layer 14. Protective layer 15 is adopted in order to protect magnetic layer 14 and to serve as part of the magnetic layer.

The conditions for manufacturing the recording medium are as follows:

First, smoothed layer 12 is formed on substrate 11 by plating, and the plated surface is finished to make it flat. Substrate 11 is then placed on a rotary table of a sputtering apparatus, and a metal target is sputtered under substantially the same conditions as those in the first embodiment, thereby forming underlayer 13, magnetic layer 14, and protective layer 15. Under substantially the same conditions as those in the first embodiment, a carbon target is sputtered to form lubricant layer 16 having an improved upper surface region.

The present inventors changed the surface regions of lubricant layers 16 and 23 manufactured as described above, and performed the CCS test for media having lubricant layers whose thicknesses fall within the range of 50 to 500 Å. As a result, it was found that the lubricant layer should preferably have a thickness in the range of 150 to 300 Å. In particular, it was confirmed that when the lubricant layer had a thickness of about 200 Å, the best lubrication properties and smoothness were obtained. It was also confirmed that the improved surface region should preferably have a thickness falling within the range of 50 to 200 Å.

The improved surface region was subjected to composition analysis, and it was found that the media which achieved the best CSS test results contained 5 to 40 atomic % of H, F, Cl, or the like.

It was found that $CH_4$, $C_2H_6$, $C_3H_8$, $CF_4$, $CCl_4$, $CCl_2F_2$, and $CHF_3$ gases were suitable as a gas to be added during sputtering, in order to form the lubricant layer. However, it was also confirmed that when a gas containing four carbon atoms or more was added, a polymer was apt to be formed, and the strength of the lubricant layer was consequently reduced.

(EXAMPLE 1)

Aluminum alloy substrate 11 having an outer diameter of 95 mm, an inner diameter of 25 mm, and a plate thickness of 1.27 mm was prepared. An Ni-P plating layer having a thickness of 12 μm was formed on the surface of substrate 11, in advance, and its surface was mirror-polished to form hardened/smoothed layer 12.

The above substrate was placed on a magnetron DC sputtering apparatus, and was sputtered, thereby to form under-layer 13, magnetic layer 14, and protective layer 15. The methods and conditions for forming these layers were as follows:

The substrate chuck table used was capable of rotation of revolving in order that layers of uniform thicknesses and uniform magnetic characteristics could be obtained. The table was rotated at 10 rpm. In the film formation step, a rare gas, e.g., Ar gas, was introduced at an initial vacuum pressure of $5 \times 10^{-7}$ Torr, and sputtering was performed at room temperature, at an introduced Ar gas pressure of $4 \times 10^{-2}$ Torr, and at a sputtering power of 1 kW. A 3,000-Å thick Cr layer was formed as underlayer 13 for improving the crystallographical orientation of the magnetic layer. A 500-Å thick Co-Ni laeyr as magnetic laeyr 14 and a 300-Å thick Co-Cr layer as protective layer 15 were formed thereon. Note that the Co-Cr protective layer also serves as a magnetic layer.

At the same Ar gas pressure and sputtering power, a carbon target was sputtered to form a 100-Å thick carbon layer. Immediately thereafter, a $CH_4$ gas was introduced to the sputtering apparatus, the flow rate ratio of the Ar and $CH_4$ gases was set to be 1:1, and the total combined pressure thereof was set to be $8 \times 10^{-2}$ Torr. The carbon target was sputtered to form a 100-Å thick carbon layer containing the C-H bond on the previously formed carbon layer. Upon completion of the above operations, lubricant layer 16 containing the C-H bond was formed on the surface layer.

Various magnetic characteristics of the thus-completed magnetic recording medium were then measured. As a result, a longitudinal coercivity of 900 Oe was obtained, as were satisfactory other magnetic characteristics, including saturation magnetization. Furthermore, the electrical-magnetic conversion characteristics of the medium were examined, and a wear resistance test against head contact, and an environmental test were conducted. As a result, the following characteristics were obtained:

As regards the electrical-magnetic conversion characteristics, high-density recording of 35 kbpi could be performed. A CSS test, involving 30,000 head-falls, was applied to the discs. The results were that 98% of the discs tested were found to have surfaces substantially free from damages. In the environmental test, the resultant media were left to stand at a temperature of 85° C. and at a relative humidity of 85% for 1,000 hours. No change in outer appearance was found, and no increase in surface defects was found. Thus, it could be confirmed that the recording medium possessed sufficiently satisfactory corrosion resistance.

Note that the presence of the C-H bond in the lubricant layer was confirmed by FT-IR (Fourier transform infrared spectroscopy), and a mixture of 5 to 40 atomic % of H was also confirmed.

When a conventional lubricant layer containing only carbon without a C-H bond was formed, the yield after a CSS test involving then thousand head-falls was found to be 85%. When lubricant layer 16 was formed as a carbon layer containing C-H bond throughout its entire region, the yield after a CSS test involving ten thousand head-falls was 65%.

Figure 3:
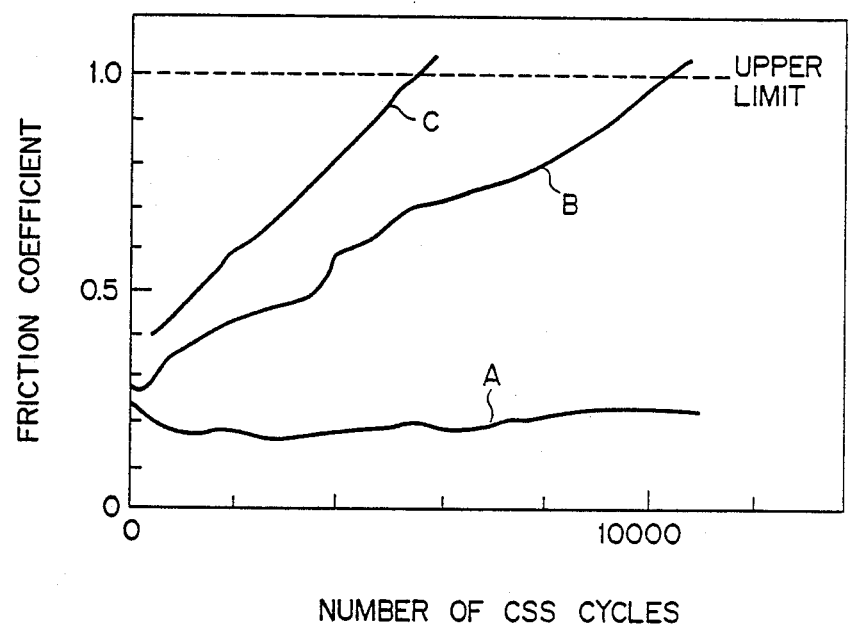
FIG. 3 is a graph showing CSS durability of a disc.

In FIG. 3, the CSS test result in relation to the magnetic recording medium of the present invention is represented by curve (A), the test result as regards a recording medium having a lubricant layer a part of which contains a C-H bond is represented by curve (B), and the test result vis-a-vis a recording medium having a lubricant layer containing a C-H bond throughout it's entire region is represented by curve (C). FIG. 3 shows the relationship between the number of CSS cycles and the coefficient of friction and means that the lubricant layer includes no C-H bond at all. In curve (B), relating to the conventional medium the coefficient of friction exceeds 1.0 as an upper-limit, after about ten thousand head-falls in the course of a CSS test. However, in curve (A), which relates to the present invention, almost no increase in the coefficient of friction is noted, even after ten thousand head-falls during a CSS test.

(EXAMPLE 2)

Following the same procedures as in Example 1, an anodized aluminum layer was formed, by anodizing, on aluminum alloy substrate 11, and its surface was polished to form hardened/smoothed layer 12. Thereafter, following the same procedures as in Example 1, underlayer 13, magnetic layer 14, protective layer 15, and lubricant layer 16 were formed. However, for protective layer 15, a 300-Å thick Cr film was used, and the thickness of magnetic layer 14 was 600 Å. Upon formation of lubricant layer 16, a $CF_4$ gas was used in place of the $CH_4$ gas. For this reason, the presence of a C-F bond was found in lubricant layer 16. In this example, characteristics equivalent to or better than in Example 1 were confirmed.

(EXAMPLE 3)

A glass plate having a thickness of 2 mm and a diameter of 3.5 inches and which had a flat surface was prepared as non-magnetic substrate 21. A 500-Å thick Co-Pt layer was formed directly on the substrate, as magnetic layer 22. A 150-Å thick carbon layer, as lubricant layer 23, obtained by sputtering a carbon target in Ar gas, and a 150-Å thick carbon layer, containing a C-H bond obtained by sputtering the carbon target while introducing a gas containing $C_2H_6$ at the same flow rate as that of the Ar gas, were formed on magnetic layer 22. In this example, the same characteristics as in the above examples were obtained.

What is claimed is:

1. A magnetic recording medium comprising:
  a non-magnetic substrate;
  a magnetic recording layer formed on said non-magnetic substrate; and
  a lubricant layer having a thickness of 150–300 Å and consisting of first and second sub-layers, formed on said magnetic recording such that said first sub-layer is in direct contact with the magnetic recording layer, the first sub-layer consisting of carbon which is not chemically bonded to another element, and the second sub-layer having a thickness of 50 to 200 Å and consisting of elemental carbon and and a non-polymer carbon compound with at least one element selected from a group consisting of hydrogen and halogen.

2. A medium according to claim 1, wherein said magnetic layer is formed of a cobalt material.

3. A medium according to claim 1, wherein a protective layer formed of a Co-Cr alloy is provided between said lubricant layer and said magnetic layer.

4. A medium according to claim 1, wherein said non-magnetic substrate comprises an aluminum alloy plate or a glass plate.

5. A medium according to claim 1, wherein 5 to 40 atomic % of said element is contained in a surface region of the lubricant layer.

6. A method of manufacturing a magnetic recording medium having a magnetic recording layer on a non-magnetic substrate, said method comprising the steps of:
  sputtering a carbon target in an inert gas atmosphere, to form a first sub-layer consisting of carbon which is not chemically bonded to another element on a magnetic recording layer as a member to be processed; and
  sputtering the carbon target while adding a gas containing at least one element selected from the group consisting of hydrogen and halogen, to form a second sub-layer on said first sub-layer, the second sub-layer being 50 to 200 Å, and the second sub-layer consisting of elemental carbon and a non-polymer carbon compound with at least one element selected from the group consisting of hydrogen and halogen, said first sub-layer and said second sub-layer together being 150 to 300 Å thick.

7. A method according to claim 6, wherein the additive gas comprises $CH_4$, $C_2H_6$, or $C_3H_8$ or any combination of.

8. A method according to claim 6, wherein the additive gas comprises $CF_4$.

9. A method according to claim 6, wherein the additive gas comprises $CCl_4$.

10. A method according to claim 6, wherein the additive gas comprises $CCl_2F_2$.

11. A method according to claim 6, wherein the additive gas comprises $CHF_3$.

* * * * *